June 4, 1957  P. H. O'NEILL  2,794,642
BOARD GAME APPARATUS
Filed May 20, 1954  2 Sheets-Sheet 1

INVENTOR
Philip H. O'Neill

BY Holcomb, Wetherill & Brisebois
Attorneys

June 4, 1957     P. H. O'NEILL     2,794,642
BOARD GAME APPARATUS

Filed May 20, 1954     2 Sheets-Sheet 2

INVENTOR
Philip H. O'Neill
BY Holcomb, Wetherill & Brisebois
Attorneys

2,794,642

BOARD GAME APPARATUS

Philip Holmes O'Neill, Booterstown, Ireland

Application May 20, 1954, Serial No. 431,168

Claims priority, application Great Britain May 26, 1953

5 Claims. (Cl. 273—134)

This invention relates to board games of the kind in which playing pieces are moved by the players in accordance with the manipulation of a device bearing numerals such as a spinner, or the throw of a die.

Many types of such games are well known and the object of the present invention is to provide an improved game in which the result is dependent partly on the skill of the players and simulates transactions on the stock exchange in the buying and selling of shares in trading companies, or the conducting of operations involving other forms of hazard. As used in the embodiment of the invention specifically described in this specification the term "hazard" refers to an imaginary company in which the players may make an investment or speculation. In other embodiments, other appropriate risks, such as horses engaged in racing, may be indicated by this term.

According to the present invention, game apparatus comprises a playing board or the equivalent marked or formed with playing lanes or paths, playing elements comprising at least two separable pieces representing a hazard, one of which pieces is movable in accordance with the changes in the fortunes of the hazard, such changes being determined by the fortunes of the other piece which itself is movable in accordance with the manipulation of means which serve fortuitously to allot numerical or other values which determine the movement of said other piece.

The manipulated means may comprise a device bearing legends identified with the individual hazards, the same device or a second device bearing numerals which, on manipulation of the device or devices, are fortuitously related to said legends. A pair of dice may be used, one of which bears on its faces legends identified with the hazards or concerns and the other bearing numerals on its faces. Again, spinner devices of known form may be used to serve the purpose of the dice. The form of spinner employed may be one serving to identify the hazards and also the values fortuitously allotted to a particular hazard. The hazard may be constituted by a trading or similar concern or a racehorse or dog for example, and the fortunes of the hazard may be represented by the share values of the concern or the standing of the horse or dog.

Game apparatus according to the invention may further comprise elements representing stock, shares or other property or characteristics identified with the hazards or the trading concerns, elements representing contingencies which arise in the course of trade or business transactions and which affect the value of said stock, shares or other property or characteristics identified with the hazards or trading concerns and further elements representing money.

Alternative forms of game apparatus comprising items according to the invention will now be described in greater detail by way of example with reference to the accompanying drawings in which.

Figures 1, 2:
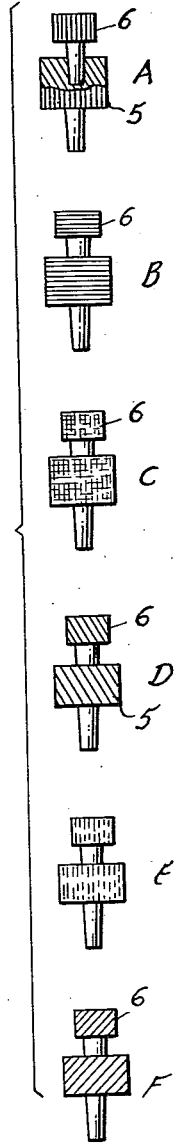
Fig. 1 represents one form of playing board, showing pieces representing four hazards as they might appear during the play.
Fig. 2 shows one form which the playing pieces may take, the pieces being shown enlarged with respect to the playing board and distinctively colored.

Referring to Fig. 1 of the drawings, the playing board 1 which is composed of fairly rigid material such as stiff cardboard, is drilled to provide six parallel spaced rows of holes or recesses 2 extending lengthwise of the board. The board is also marked transversely with a number of spaced parallel lines 3 to provide areas each including a transverse row 4 of six holes made up from one of each of the six long rows of holes.

The board, near one or both short edges as shown in the drawing, is marked to identify each lengthwise row of holes in the following manner. The row nearest the left hand edge of the board is marked with an A to identify that row as the one in which a company having the trade name A operates. The row next to it is marked B and identifies that row as the one in which the company having a trade name B operates and similarly for rows marked C, D, E and F. The board near one, or both, long edges as shown in the drawing, is marked to identify each transverse row of holes in the following manner. The lowest transverse row is marked "Bankrupt," that above it is identified with a share value 2/–, the next with a value of 4/–, and so on in increments of 2/– to 40/–, the par share value being 20/–. The row of holes next above the 40/– share value is marked "Contingencies," the next row above is marked 3%, the next 4%, and so on to 8%, the next three rows being marked 10%, 15% and 20% respectively.

Although shown as a one piece board, to facilitate compact packing, the playing board may comprise two or more separate pieces hinged together in any convenient manner, as by linen, for example.

The playing pieces shown in Figure 2 are each identified with a trading concern or company conveniently identified by the reference letters A, B, C, D, E and F and colored red, blue, yellow, green, violet and brown respectively. These letters may represent trade names of the companies as follows:

A is the trade name of Atomic Airways Ltd.
B is the trade name of Blue Bottle Breweries Ltd.
C is the trade name of Cable Cottons Ltd.
D is the trade name of Diggers Diamond Mines Ltd.
E is the trade name of Easygoing Engineering Co. Ltd.
F is the trade name of Fairweather Fishing Co. Ltd.

The playing pieces each consist of a short main wooden peg of the form shown in Fig. 2, shaped to fit easily into the holes in the board. The peg top 5 is of enlarged diameter and is recessed with a hole of the same diameter as the holes in the board to receive a smaller plastic peg 6. The main pegs will be referred to as the Parent pegs and the smaller pegs will be referred to as the Traveller pegs. The Parent and Traveller pegs representing each individual company are colored differently from the rest so as to facilitate identification.

Two cube dice are provided, one having its six faces marked respectively A, B, C, D, E and F, and the other being an ordinary playing die with its faces numbered 1–6.

Six sets of share certificate cards of any easily handled convenient form are provided, each set comprising 10 cards and each card constituting a certificate of ownership of 100 ordinary shares of £1 each. The sets of cards are colored to identify them with the six playing pieces representing the six companies.

A set of 20 Contingency cards, again of any convenient form and about the size of an ordinary visiting card, is also provided, each card being marked to relate to a specific favourable or adverse contingency. One card may be marked for example, "Government restrictions relaxed, shares jump 2/–" and another may be marked "Six weeks' strike at key works, shares weak, falling 2/–," another "Company declares special interim dividend of 10%" and so on.

There is also provided a quantity of slips of paper representing money, the slips of paper being marked with any convenient denominations.

The game may be played by two or more players, the number of players being limited only by the number of share certificates and money tokens supplied with the game. In playing the game, one player, or a non-player, is delegated to act as Stockbroker, Banker or Agent. In one method of playing, when there are three or more players, the Banker takes four times as many share certificates as ther are players selected equally (or as nearly as possible) from each of the six companies. For example, if there are five players, the Banker would choose the 20 (5×4) certificate as follows:

3 from each of 4 companies _____ 12
4 from each of 2 companies _____ 8
                                               —
                                               20

The rest of the share certificates are kept out of the game except when issued as bonus shares in a manner to be described later. The Banker issues half the certificates he has selected, giving 2, that is to say, 200 shares of £1 each, plus £50 in cash (total £250) to each player and holds back the other half of the certificates he has selected, for sale during the game.

At the start of the game, the Contingency cards are placed face downwards near the board and the Parent pegs, with their Traveller pegs, are placed in their respective lanes on the board opposite the par share value (20/–). The values above and below par represent the current or market price of the shares in a particular company, as indicated by the position of the Parent peg of that company during the course of the game, as will be described.

The player on the Banker's left starts play by throwing the two dice so that a letter will appear face upwards on one and a number on the other. The company bearing the same mark as the letter thrown has its Traveller peg moved up the board the number of holes thrown on the numbered dice. For example, if B is thrown on one die and 4 on the other, the Traveller peg for Blue Bottle Breweries Ltd. is moved 4 holes up the board keeping to its own individual line marked B on the board. The dice are thrown by the rest of the players in rotation and the Traveller pegs moved accordingly.

As soon as any Traveller peg reaches the top of the board, that is to say the hole in the transverse row marked 20%, the game is halted while the Banker pays out the dividends and moves the Parent pegs as follows:

The company whose Traveller peg reaches the top pays 20% on its shares and has its Parent peg moved up two holes, that is to say its shares rise by 4/–.

A company whose Traveller peg is above the space marked "Contingencies" and below the top of the board, pays dividends at the interest shown as a percentage at the side of the board and its Parent peg is moved up one hole, that is to say its shares rise by 2/–.

Companies whose Traveller pegs are opposite the space marked "Contingencies" take the top card of the pile marked "Contingencies" and carry out its instructions. The card is then replaced face downwards at the bottom of the pile.

A company whose Traveller peg has not reached the level of Contingencies or above pays no dividend and has its Parent peg lowered one hole, that is to say, its shares fall by 2/–.

The Banker will find it convenient to attend to each company separately and as soon as he has paid the claims of its shareholders for dividends, he should return the Traveller peg to the Parent peg and then move the Parent peg up or down as directed above. The Banker can thus see at a glance which companies he has already dealt with and which he has not. When all the dividends have been paid and the Parent pegs moved to their new positions, the game continues as before.

A player may only buy or sell shares from the Banker immediately before he throws the dice. The Banker will deal in shares at their market value shown on the board plus £5 in fees for brokerage, stamp duty, etc. The Banker can, of course, only sell those shares he has available from his original selection at the commencement of the game. The players may do private deals amongst themselves at any time.

When a Parent peg is moved above the 40/– share level, the company in question capitalises its reserves and issues one bonus share free of charge for each ordinary share held. This lowers the market value of the shares to 20/– each. In other words, the Banker gives each shareholder another certificate taken from the certificates originally reserved out of the game and moves the company's Parent peg into the hole opposite the 20/– share value. Bonus shares rank equally in all respects to ordinary shares.

When a Parent peg reaches the bottom of the board, i. e. when a company becomes bankrupt, the shareholders call a meeting and decide on one of their number (usually the player holding the largest number of shares) to throw the numbered dice. The number thrown multiplied by ten represents the value in pounds of the assets (i. e. buildings, equipment, good will, etc.) of the company per £100 issued capital. These assets, however, are no use unless the company is kept trading. Shareholders therefore can do one of three things, namely:

(i) Make good the lack of capital, pay the difference between the issued value (par) of the shares and the assets of the company as determined above. The shares are then raised to "par" and the company continues trading.

For example, if the number thrown on the dice is 3, each shareholder by paying (100 less 3×10) i. e. £70 per 100 shares held, reinstates the company in a trading position and its Parent peg is placed opposite par.

(ii) Alternatively the player may auction his shares to some other player.

(iii) If a player fails to do either (i) or (ii) he must hand back his share certificates to the banker for cancellation.

If no shareholder makes good the lack of capital of a bankrupt company, its Parent peg and Traveller are removed from the board and the company ceases trading during the rest of the game.

A player who buys shares under the arrangements just described, stands in the same position as if he were the original owner of the shares.

The game is won by the player who first increases his capital to say £500 or some other amount agreed upon by the players. As soon as a player has £500 either in cash or shares valued at their market price, it is his own responsibility to claim to have won the game. The Banker checks his claim and if satisfied that it is correct declares that player the winner. A penalty of £25 is imposed in the case of a false claim to have won.

The procedure of the game may, of course, be varied and, for example, when there are only three players, each should start with 100 shares in each of two different companies (that is to say 200 shares of £1 each) plus £50 in cash. When there are only two players, each should start with 100 shares in each of three different companies (that is to say, 300 shares of £1 each) plus £50 in cash, and the winning sum should be increased to say £600 or any other agreed higher figure.

Figure 3:
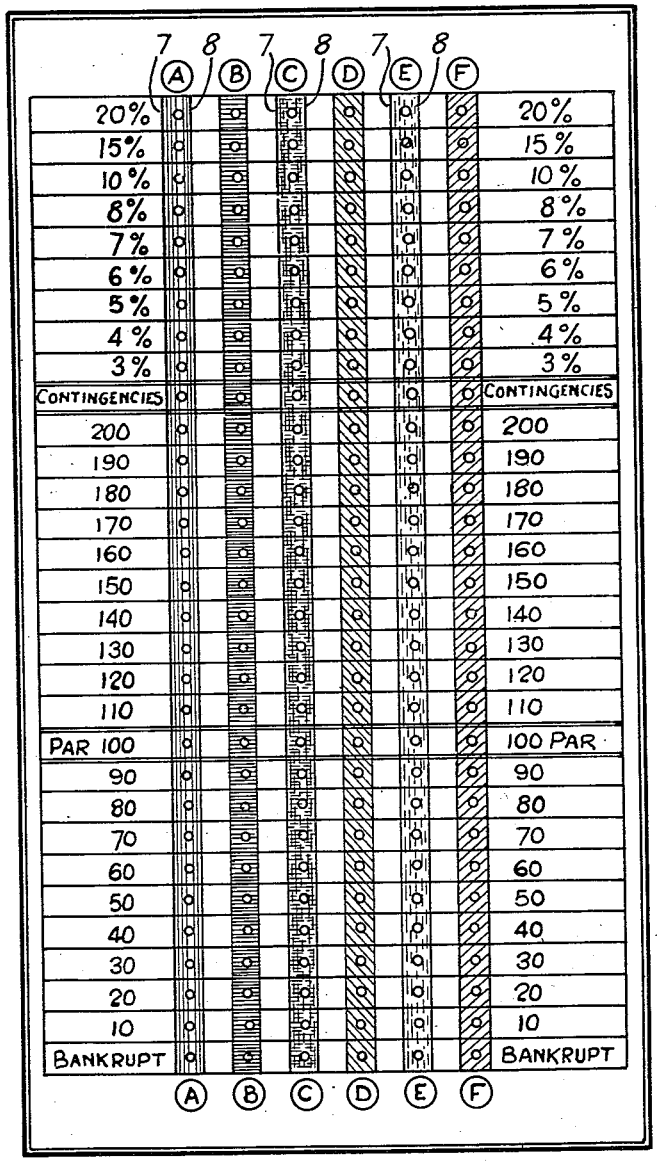
Figure 3 represents another playing board embodying my invention having an alternative form of marking.
Figure 4:
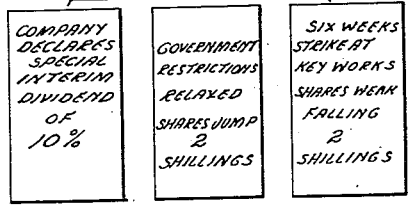
Fig. 4 shows three representative forms which the "Contingency" cards used in conjunction with the playing board may take.

Areas of the playing board corresponding to groups of share values may be colored differently from each other to assist identification and if desired the whole of a lane individual to a particular company may be colored to correspond with the company's color. Again, among other variations which may be introduced, the share values may be indicated in numerical values other than money. For example, as will be seen from Fig. 3 of the drawings, the par value is represented by the figure 100, the share values increasing above and decreasing below 100 in stages of 10. As in the case of the board described with reference to Fig. 1, a space marked "Contingencies" is provided and the spaces above are marked with dividend percentages as in Fig. 1. For convenience, the channels or paths along which the Traveller pegs travel are delineated by parallel lines 7 and 8 and it is the space between these parallel lines which may be colored to correspond with colors used to identify individual playing pieces.

It will of course be understood that the various elements comprising the game apparatus may be composed of materials other than those specifically mentioned and the playing pieces may be of any desired shape or design.

The game apparatus described lends itself to being constructed in miniature, rather in the manner of travelling chess sets, as a game in progress may be halted with the Parent and Travelling pegs retained in position in their holes, the game being continued at any convenient time.

Although the game has been described in its relation to transactions simulating those of the Stock Exchange, it will be understood that the use of composite playing pieces in the manner described may be adapted to various other kinds of game using playing pieces representing hazards exemplified by racehorses, dogs, motor cars, ships or other vessels. The Traveler peg will represent the races and changes in fortune of the Parent peg representing such alternative forms of hazard, instead of being constituted by changes in share values as in the case of trading concerns, may be constituted by changes in the relative standing or value applying to the alternative forms of hazard.

I claim:

1. Game apparatus for a plurality of players comprising a board having parallel rows of aligned positioning means constituting lanes accommodating playing pieces which represent hazards, each of said rows being divided into successive lengthwise extending groups of positioning means having designations sequentially identifying the respective positioning means of each group, the grouping and identifying designations being alike in the several rows and the successive positioning means therein being in alignment laterally, a set of playing pieces representing various hazards removably engaging said positioning means, there being at least as many playing pieces as rows on said board and each playing piece consisting of two parts, a lower parent part and an upper traveller part, each parent part having two engaging means one of which cooperates selectively with any one of said positioning means in a row designated for said hazard and the other of which engaging means cooperates with engaging means on the associated traveller part for removably securing it in place and each traveller part having engaging means cooperating selectively with said engaging means on its associated parent part and with any one of the positioning means in said designated row other than that engaged by said parent part, whereby both parts of said playing piece are retained in selected positions in said designated row subject to movement along said row in response to the fortune of said hazard to engage and be retained by other positioning means in said row, as determined fortuitously by the operation of means indicating both the hazard and its fortune.

2. Game apparatus as set forth in claim 1 wherein the parallel rows are respectively designated by contrasting colors, the playing pieces are respectively designated by contrasting colors conforming to those of the parallel rows and the upper part of each playing piece is readily distinguishable from the lower part.

3. Game apparatus as set forth in claim 1 wherein the two parts of each playing piece are each provided with a pin for engaging a mating hole in said board and each parent parting part is provided with a hole for engagement by the pin of a mating traveller part.

4. Game apparatus as set forth in claim 1 comprising also simultaneously operatable dual means for determining fortuitously the particular hazard and its fortune.

5. Game apparatus as set forth in claim 1 wherein the board is provided with markings designating at least one transverse line of positioning means as fortune contingencies comprising also a plurality of cards which selectively indicate the nature of the respective contingencies to which the fortune of any hazard piece in said transverse line is subject.

References Cited in the file of this patent

UNITED STATES PATENTS

| | | |
|---|---|---|
| 1,161,984 | Scott | Nov. 30, 1915 |
| 1,268,659 | Wright | June 4, 1918 |
| 1,302,805 | Jentz | May 6, 1919 |
| 1,460,966 | Johnson | July 3, 1923 |
| 1,482,708 | Small | Feb. 5, 1924 |
| 1,779,584 | Brown | Oct. 28, 1930 |
| 2,026,082 | Darrow | Dec. 31, 1935 |
| 2,174,058 | McGennis | Sept. 26, 1939 |
| 2,239,779 | Clark | Apr. 29, 1941 |
| 2,277,301 | Channer | Mar. 24, 1942 |
| 2,282,128 | Gubbins | May 5, 1942 |
| 2,485,143 | Duncan | Oct. 18, 1949 |